United States Patent [19]

Anglin et al.

[11] Patent Number: 5,489,127
[45] Date of Patent: Feb. 6, 1996

[54] MOUNTING APPARATUS WITH REDUCED RESISTANCE BEAD SEAL

[75] Inventors: Paul E. Anglin, Troy; Glen Gibbs, Warren, both of Mich.

[73] Assignee: ITT Corporation, New York, N.Y.

[21] Appl. No.: 111,980

[22] Filed: Aug. 25, 1993

[51] Int. Cl.⁶ .................................................. F16L 25/00
[52] U.S. Cl. ...................... 285/328; 285/354; 285/334.5; 285/382; 285/917; 29/523; 29/890.15; 72/316
[58] Field of Search ................. 285/334.5, 332, 285/328, 354, 382; 29/523, 890.53, 890.15; 72/316, 317

[56] References Cited

U.S. PATENT DOCUMENTS

| 533,150 | 1/1895 | Trethewey et al. ................. 285/246 |
| 771,682 | 10/1904 | Sussman ........................... 285/334.5 |
| 795,376 | 7/1905 | Von Stone ......................... 285/328 |
| 1,058,542 | 4/1913 | Brown ............................. 285/334.5 |
| 2,242,831 | 5/1941 | McIntosh .......................... 72/317 |
| 2,267,416 | 12/1941 | Neukirch .......................... 285/334.5 |
| 2,289,382 | 7/1942 | Parker ............................. 285/334.5 |
| 3,214,198 | 10/1965 | Peuchmaur ......................... 285/334.5 X |
| 3,265,413 | 8/1966 | Currie ............................ 285/334.5 X |
| 3,628,815 | 12/1971 | King .............................. 285/334.5 X |
| 3,833,984 | 9/1974 | Dietzel ........................... 29/890.15 |
| 4,054,157 | 10/1977 | Moseley, Jr. ...................... 285/354 X |
| 4,597,596 | 7/1986 | Tozer ............................. 285/917 X |
| 4,598,937 | 7/1986 | Sugao ............................. 285/334.5 |
| 4,842,310 | 6/1989 | Müffke et al. ..................... 29/523 |
| 4,893,657 | 1/1990 | Usui .............................. 285/334.5 |
| 4,907,830 | 3/1990 | Sasa et al. ....................... 285/917 X |
| 4,980,961 | 1/1991 | Caudill ........................... 72/316 |
| 5,002,316 | 3/1991 | Chohan ............................ 285/917 |
| 5,052,719 | 10/1991 | Boehm . | |
| 5,080,405 | 1/1992 | Sasa et al. ....................... 285/903 X |
| 5,271,647 | 12/1993 | Usui . | |
| 5,283,951 | 2/1994 | Davenport et al. .................. 29/890.15 |
| 5,354,107 | 10/1994 | Takikawa ....................... 285/334.5 |

FOREIGN PATENT DOCUMENTS

| 318212 | 1/1902 | France ............................ 285/328 |
| 550298 | 3/1923 | France ............................ 285/328 |
| 1141975 | 9/1957 | France ............................ 285/334.5 |
| 1196320 | 11/1959 | France ............................ 285/334.5 |
| 2906317 | 8/1979 | France ............................ 285/903 |
| 2465941 | 3/1981 | France . | |
| 14718 | of 1888 | United Kingdom ................... 255/328 |
| 22756 | of 1893 | United Kingdom ................... 285/328 |
| 18976 | of 1895 | United Kingdom ................... 285/328 |
| 21642 | of 1912 | United Kingdom ................ 285/334.5 |
| 207865 | 5/1923 | United Kingdom ................... 285/328 |
| 224021 | 8/1923 | United Kingdom . | |
| 411328 | 6/1934 | United Kingdom . | |
| 443991 | 3/1936 | United Kingdom . | |
| 2032035 | 4/1980 | United Kingdom . | |
| 2140115 | 11/1984 | United Kingdom ................... 285/328 |
| 2260175 | 4/1993 | United Kingdom . | |

*Primary Examiner*—Dave W. Arola
*Assistant Examiner*—Heather Chun Shackelford
*Attorney, Agent, or Firm*—Robert P. Seitter; J. Gordon Lewis

[57] ABSTRACT

A reduced resistance bead seal is integrally formed on a mounting surface of one of two matingly engageable members to form a leak-free seal between the two members despite any eccentricity or angular variances between the two members. In one embodiment, the reduced resistance bead is formed on an inner conical flange of an inverted flared end of a hollow fluid conduit. The bead presents a deformable surface as a fitting urges the flared end of the conduit into engagement with a conical seat in a receiver where eccentricity or angular variances exist between the flared end of the conduit and the conical seat. A unique method and a unique forming tool are used to form the reduced resistance bead in the flared end of the conduit simultaneously with the flaring of the end of the conduit.

12 Claims, 3 Drawing Sheets

MOUNTING APPARATUS WITH REDUCED RESISTANCE BEAD SEAL

BACKGROUND OF THE INVENTION

1. Field of the Invention

The present invention relates, in general, to fluid conduits and, more specifically, to fluid conduit mounting apparatus.

2. Description of the Art

It is well known to flare the end of a fluid conduit to enable the end of the conduit to be easily attached to a suitable element, such as a valve, receiver, fitting, etc. In high pressure fluid conduits employed in vehicle brake and fluid lines, SAE standards require a double or inverted flared end on such conduits. In a double or inverted flared conduit, the end of the conduit is flared radially outward from the axial extent of the conduit and then an outer portion of the end is bent inward in parallel to and in registry with an outer surface of the flared end of the conduit to form a double flared wall at the end of the conduit with inner and exterior conical surfaces.

In a typical mounting arrangement, the double or inverted flared end of the conduit sealingly mates with a conically shaped seat in a female fitting, commonly referred to as a receiver. A bore in the receiver aligns with the bore in the conduit to form a fluid flow path therethrough. A male fitting is threadingly engaged with the receiver and also includes an internal conical surface which engages the exterior conical surface of the flared end of the conduit to urge the inner, folded over conically shaped flange of the flared end of the conduit into mating engagement with the conical seat in the receiver.

In the past, the fittings were made on lathes with rotating spindles such that the threads and the seal face or surface were machined on the same spindle. This method of processing produced concentric flare cone and thread center lines. However, current practice utilizes a more economical cold headed process for making the fittings and the separately processed rolled threads do not deliver the same high degree of concentricity as the more costly screw machine method.

The proper operation of such a fluid conduit fitting requires that the flared end of the conduit completely seat on the mating conical seat of the receiver about its full 360° surface. This is not always possible due to the aforementioned use of the cold headed process which does not deliver the same high degree of concentricity as the screw machine method of forming such fittings and receivers. Further, traditional manufacturing tolerance of TIR (total indicated runout) can result in an eccentric alignment of the flared end of the conduit and the mating conical seat of the receiver, despite such parts being within their specified manufacturing tolerances. A large TIR can create a gap extending along a predetermined angular extent of the adjacent conical surfaces of the conduit and the receiver which causes leaks in the fluid system.

In the past, when a leak occurred, it was common to apply more torque to the fitting to forcibly urge the fitting and thereby the entire conical surface of the flared end of the conduit into engagement with the conical seat of the receiver. However, such additional torque is not always able to be easily applied to the fitting. In the past, sealing was obtained by utilizing a soft material for either the conduit or the internal flare seat in the receiver. Typically, the conical flare seat in the receiver was made of brass or, in later years, a brass seat insert was mounted in a steel receiver body. The softer brass material of the conical flare seat deformed under increased torque applied to the fitting to enable the flared end of the conduit to be forced into mating contact with the conical seat over the full 360° extent of the conical seat despite any eccentricity which may exist between the flared end of the conduit, the conical seat or the axial alignment of the conduit with the conical seat in the receiver.

Newer receivers are formed primarily of steel, cast iron or anodized aluminum which are harder than brass and not as forgiving. Such receivers require higher torque to deform the flared end of the conduit into complete mating engagement with the conical seat of the receiver to form a leakproof annular seal between the mating surfaces thereof. Such increased torque is not always possible or desirable.

Thus, it would be desirable to provide a mounting arrangement for two mating elements which includes a reduced resistance bead on the mating surface of one of the elements to form a leakproof seal when the two elements are brought together into forced engagement. It would also be desirable to provide a unique flared end on a high pressure fluid conduit which creates a leak free seal with a mating surface or seat without the use of additional seal elements, increased tightening torque, special tools or modifications to the mating fitting elements. It would also be desirable to provide a flared end conduit having unique means for forming a leakproof seal with a mating surface of another element, which means is integral with the conduit so as to always be present with the conduit, which eliminates any additional manufacturing operations required to assemble the seal, and which is formed of the same material as the conduit. It would also be desirable to provide a seal on the flared end of a fluid conduit which is deformed under normal or even reduced torque to account for eccentricity and angular variances between the mating surfaces of the fitting and the conduit end. Finally, it would be desirable to provide a mounting apparatus, method and tool which provides a unique seal element on the flared end of a fluid conduit for forming a leakproof seal with a mating element which is manufacturable using conventional methods and techniques.

SUMMARY OF THE INVENTION

The present invention is a mounting apparatus having a unique seal element for forming a leakproof seal between the mating mounting surfaces of two joined members despite any eccentricity, angular variances or misalignment of the two joined members.

In one embodiment, first and second members have first and second matingly engageable mounting surfaces, respectively. A reduced resistance bead, preferably an annular bead, is integrally formed with one of the members as a continuous one-piece part of the member and extends outward from the mounting surface of the member to form a deformable seal between the two members when the two members are forcibly joined together. The reduced resistance bead may take one of a number of different shapes, including an arcuate shape, i.e., spherical or elliptical, as well as various polygonal shapes, such as generally rectangular, trapezoidal, etc.

In a more specific application, the first member has a first end extending at a predetermined angle from the axial extent of the first member. A first mounting surface is formed on the first end of the first member for mating engagement with the mounting surface of the second member. The reduced resistance bead is formed on the mounting surface of the first member. In this application, the first member may comprise a fluid conduit in which the first end flares radially outward in a single flange from the axial extent of the conduit, at a predetermined angle, such as 45°. The first end of the conduit may also be formed as a double or inverted flared end with an outer conical flange and an inner conical flange formed as a continuous extension of the outer flange and disposed radially inwardly of and in registry with the outer flange. The reduced resistance bead is formed on and extends outward from the inner flange.

The present invention also comprises a fluid conduit connector apparatus which includes a fluid conduit having a first end flared radially outward from the diameter of the conduit to an enlarged diameter. The flared end of the conduit has a first exterior flange with a first conical exterior surface formed thereon. In a double or inverted flare conduit a portion of the flared end of the conduit is bent inwardly from the first exterior flange into registry with the first flange to form an inner flange having a second conical surface thereon disposed substantially parallel to the first conical surface of the first exterior flange. A seal element in the form of a reduced resistance bead is integrally formed as a continuous part of the inner flange and extends outward from the second conical surface of the inner flange. A first fitting having a through bore for receiving the fluid conduit therethrough has a conical surface engageable with the first conical surface on the flared end of the conduit. In a single flared end conduit, the bead is formed on the inner or second conical surface of the single end flange. A receiver means has a conical seat for matingly receiving the second conical surface of the fluid conduit thereon. Means are provided for forcibly attaching the fitting to the receiver means to thereby force the conical surface of the fitting into engagement with the first exterior conical surface of the conduit and the second conical surface of the conduit into engagement with the conical seat of the receiver means.

If any eccentricity or angular variances exist in the first and second conical surfaces of the conduit, the conical surface of the fitting, or the conical seat of the receiver means when such elements are engaged with each other, the softer of the conical seat or the reduced resistance bead on the conduit will deform to enable the second or inner conical surface of the conduit to completely seal over its full 360° annular extent with the conical seat of the receiver means.

Also disclosed in the present invention is a method of forming a seal element on a flared end on a fluid conduit. The method comprises the steps of:

a) flaring the first end of a hollow fluid conduit radially outward from the axial extent of the conduit;

b) bending a portion of the first end of the conduit inward on itself to form exterior and inner substantially parallel conical surfaces on the first end of the conduit; and c) forming a reduced resistance bead on the inner conical surface of the conduit extending outward from the inner conical surface.

Preferably, the step of forming the reduced resistance bead is performed simultaneously with the step of bending the first end of the conduit inward on itself.

This method may be modified by eliminating step (b) for a single flared end conduit and forming the bead on the inner surface of the single flared end of the conduit.

The present invention also describes a method of forming a reduced resistance section on any component. According to this method, first and second members are formed with first and second mounting surfaces, respectively. A reduced resistance bead is formed on the mounting surface of one of the members and extends outward from the mounting surface for engagement with the corresponding mounting surface of the other member when the two members are forcibly engaged.

Also disclosed is a unique tool for forming a reduced resistance bead in a hollow fluid conduit having a flared end with folded over, substantially parallel, inner and outer flanges. The tool includes a shank having a conical surface formed at one end. A recess is formed in the conical surface having a predetermined shaped cross section to form a reduced resistance annular bead when the tool is forcibly urged into the flared end of the fluid conduit. A piloting nose is mounted at the end of the conical surface.

The present invention provides a unique mounting apparatus which provides a leak free seal between the mating surfaces of two elements despite any eccentricity, angular variances, or misalignment of the two elements. Such leak resistance or leak free sealing is provided at normal and even reduced joint loading torques or forces. The use of an annular reduced resistance bead formed on the mounting surface of one element also provides a longer leak path for increased leak resistance.

The mounting apparatus of the present invention is particularly useful on the flared ends of fluid conduits which are sealingly attached to receivers by means of fittings. The present invention provides a leak free seal between the mating surfaces of the flared end of the conduit and a conical seat in the receiver even if eccentricity or angular variances exist between the conical mating surfaces of the conduit and the conical seat of the receiver.

The reduced resistance section or bead provides improved sealing and leak resistance without the use of increased loading forces on the fitting which necessitate metal deformation of the fitting and/or special tooling or the use of separate seal members, all adding to the cost of the fitting assembly. The reduced resistance bead is integrally formed with the conduit so as to always be present with the conduit so as to eliminate any separate assembly steps for attaching a seal element to the conduit. Further, the reduced resistance bead is integrally formed with the conduit so as to be constructed of the same material as the conduit thereby eliminating any design or use considerations relating to different deterioration rates of disparate materials.

A conduit or member having the reduced resistance bead of the present invention formed thereon is usable as a direct, drop-in replacement for similar conduits or members without modification to the fitting, receivers or assembly methods associated with such components.

Finally, the reduced resistance annular bead is angular tolerant in that it seats in a centered mounting arrangement or a conical seat or surface despite any eccentricity or angular variances between the conduit and the mating seat or surface.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

The present invention is directed to the formation of a seal between the mating surfaces of two elements which creates a leak free seal despite any eccentricity, angular variance, or misalignment between the mating surfaces of the two elements.

Figure 1:
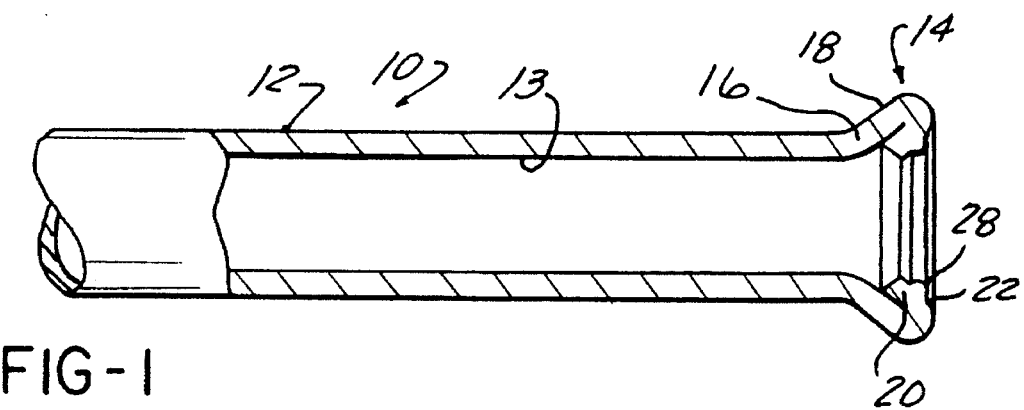
FIG. 1 is a cross sectional view of a fluid conduit having a reduced resistance bead of the present invention formed on the flared end thereof.

Referring now to FIG. 1, there is depicted one example of the use of the present invention on the flared end of a fluid conduit 10. It will be understood, as described in greater detail hereafter, that the present invention may also be employed with other types and shaped elements.

The fluid conduit 10 is typical of a conduit design to carry fluid, such as air, hydraulic fluid, etc., under pressure. The conduit 10 typically has a circular cross section with an internal bore 13 formed by a side wall 12. The conduit 10 may have any thickness side wall 12, I.D. and O.D. Further, the conduit 10 may be formed by any metallic material, such as steel, aluminum, copper, etc.

As is conventional, the conduit 10 has a first end 14 having an opening therein which communicates with the internal bore 13 of the conduit 10. The first end 14 is flared radially outward at a predetermined angle to enable the first end 14 of the conduit 10 to be sealingly mounted to another member, such as a receiver in an example described in greater detail hereafter.

According to SAE standards for the use of high pressure fluid conduits in vehicle brake lines, fuel lines, etc., the first end 14 of the conduit 10 is flared outward from the axial extent of the conduit 10 at a 45° angle. It will be understood that any other angle may be employed with the present invention, including flared end angles greater than 0° and up to 90° or more.

As shown in FIG. 1 for one embodiment of the present invention, the first end 14 of the conduit 10 has a double or inverted flared end construction formed of an exterior flange 16 having an exterior conical-shaped surface 18. A portion of the first end 14 is folded or bent inward onto itself to form an inner flange 20 which is disposed in registry with and parallel to the exterior flange 16. The inner flange 20 forms an inner conical surface 22 which is desirably parallel to the exterior surface 18 of the exterior flange 16. The inner conical surface 22 is designed to sealingly mate with a correspondingly formed conical seat on a mating element, such as a receiver in metal-to-metal contact.

Figure 8:
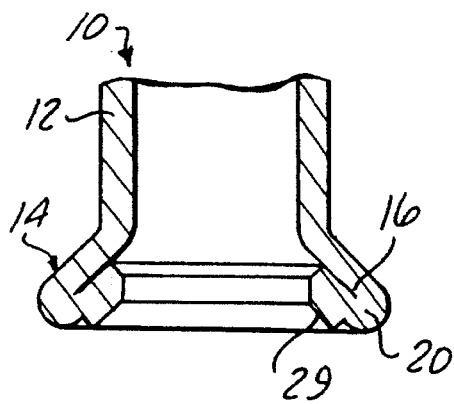
FIG. 8 is a partial, enlarged view, showing an alternate configuration of the reduced resistance bead shown in FIG. 1.

Ideally, the inner and outer surfaces 22 and 18, respectively, on the conduit 10 are arranged in parallel and concentric to each other and to the axial center line of the conduit 10. However, due to manufacturing tolerances, manufacturing variations, and variations in the material used to form the conduit 10, eccentricity or angular variances between these surfaces and with the mating, conical seat may exist. The present invention uniquely provides a compressive bead seal or bead 28 having a reduced resistance which is integrally formed as a unitary part of the inner flange 20. The bead 28 extends outward from the inner flange 20 as shown in FIG. 1. Further, the bead 28 may have any one of a number of different shapes or cross sections. For example, the bead 28 may have an arcuate shape, such as the illustrated spherical shape or an elliptical shape. Alternately, as shown in FIG. 8, the bead 28 may have a generally polygonal shape, such as a trapezoidal, triangular, rectangular, rhombic, etc., denoted by reference number 29 with flat sides. In addition, although one annular bead 28 is shown in FIG. 1, multiple beads having the same or different cross section shapes, as described above, may also be formed on the inner flange 20 of the conduit 10.

The reduced resistance bead 28 provides a smaller volume of material than that of the entire inner flange 28 of the conduit 10 so as to be easily deformable itself or to easily deform a softer mating element to conform the first end 14 of the conduit 10 to a mating element to form a leak free seal therebetween.

Figure 2:
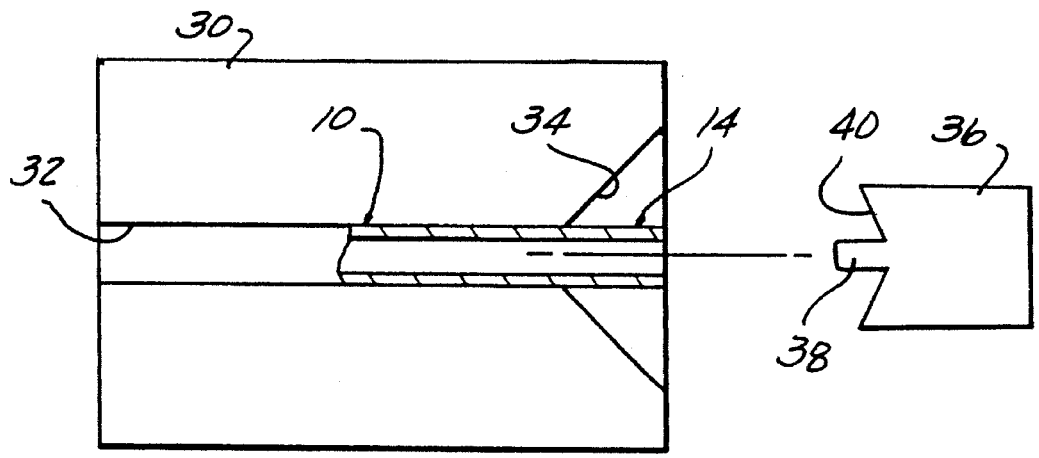
FIG. 2 is a plan view showing the first step in a method of forming the flared end of a conduit with a reduced resistance bead shown.
Figure 3:
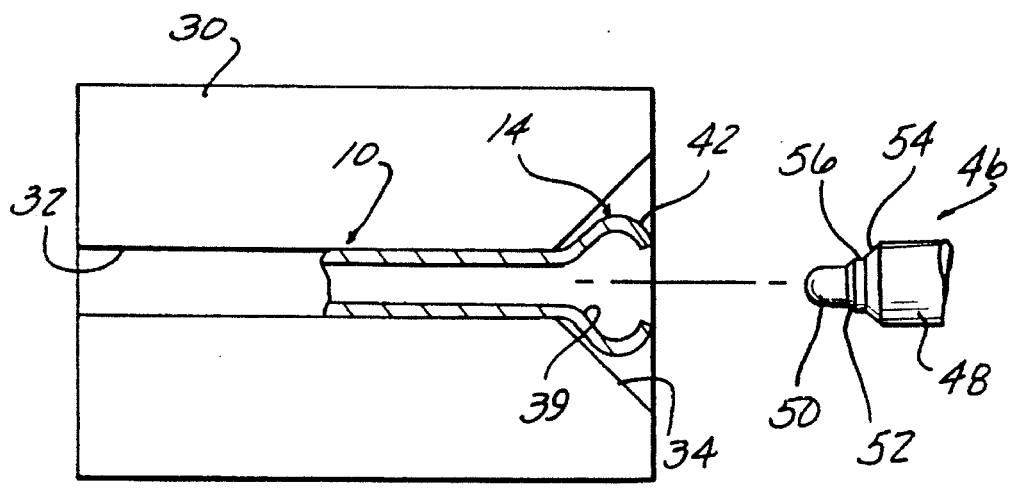
FIG. 3 is a plan view of a second step in the method of the present invention showing the formation of the reduced resistance bead on the inverted flared flange end of the conduit formed in FIG. 2.
Figure 4:
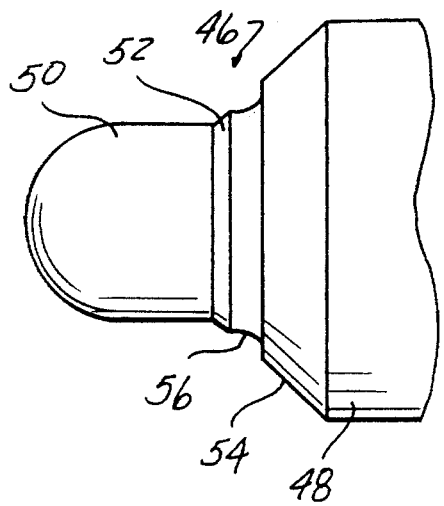
FIG. 4 is an enlarged view of a unique tool used to form the reduced resistance bead in the inverted flange of the conduit shown in FIG. 3.

FIGS. 2, 3 and 4 depict a method and an unique tool used to form the reduced resistance bead 28 as well as to flare the first end 14 of the conduit 10 to the shape shown in FIG. 1.

In FIG. 2, one of a pair of holding blocks 30 is depicted. The holding block 30 includes an elongated groove or bore 32 of circular cross section for receiving the conduit 10 therein. The bore 32 extends continuously to flared end walls 34 which are disposed at a predetermined angle, such as 45°, from the axial extent of the bore 32. The conduit 10 is mounted in the holding block 30, with the unformed first end 14 disposed adjacent one end of the holding block 30 in the flared end wall portion 34. A mating holding block 30 is then secured to the holding block 30 shown in FIG. 2 and a tool, such as a punch 36, is forcibly urged against the first end 14 of the conduit 10.

The punch 36 can be formed with a reverse angled face 40, spaced from the end of a pilot nose 38, which angled face 40 engages the end 14 of the conduit 10 and forces the end of the conduit 10 radially inward as shown in FIG. 3.

In FIG. 3, the same or a different pair of holding blocks 30 are used in a second step of the present method. After the end 14 of the conduit 10 has been flared radially outward and the outer end portion thereof bent inwardly, as shown in FIG. 3, a different and unique tool 46 is employed to complete the flaring as well as to form the reduced resistance bead 28 in the first end 14 of the conduit 30. As shown in FIG. 3, and in greater detail in FIG. 4, the tool 46 is formed with a generally cylindrical shank 48. A conical surface formed of a first conical section 52 and a spaced, second conical section 54 are formed on one end of the shank 48 and extends axially therefrom. A piloting nose 50 having an O.D. smaller than the I.D. of the conduit 10 is formed at the end of the first conical surface 52 and serves to center the tool 46 in the conduit 10.

A recess 56 is formed between the first and second conical surfaces 52 and 54. The recess 56 forms the reduced resistance bead 28 in the inner flange 20 of the conduit 10 when the tool 46 is forcibly urged into the conduit 10 mounted in the pair of holding blocks 30. Thus, the recess 56, although being illustrated as having a generally arcuate or spherical cross section, may be formed in any one of the above-described shapes to provide the desired shaped reduced resistance bead 28.

In use, when the tool 46 is forcibly urged into the first end 14 of the conduit 10 mounted in the holding blocks 30, the first and second conical surface portions 52 and 54 bend the partially folded over flange 42 of the conduit 10 back on itself into registry with the outer flange 16 of the conduit 10 until the outer flange 16 is disposed in registry with the flared end walls 34 of the holding blocks 30. This forms the outer and inner flanges 16 and 20 at the desired flared angle, such as 45°, as described above. At the same time, the forced engagement of the tool 46 with the conduit 10 extrudes a portion of the conduit metal in the first end 14 of the conduit 10 from the inner flange 20 into the recess 56 in the tool 46 to form the reduced resistance bead 28 having a shape corresponding to the shape of the recess 56.

Besides using the tool 46 to extrude the bead 28 from the end of the conduit 10, the bead can also be formed by machining to the desired shape.

Figure 5:
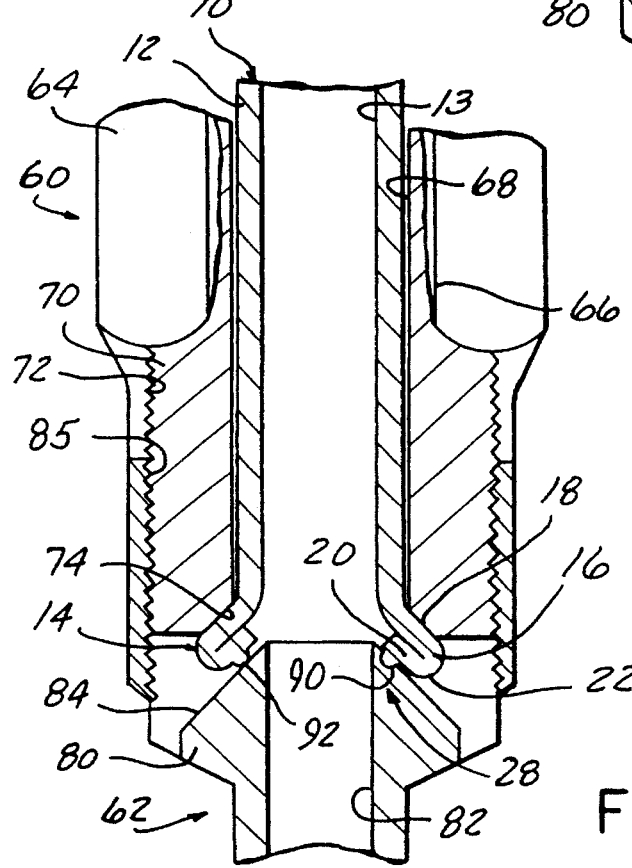
FIG. 5 is a cross sectional view showing the assembly of the conduit shown in FIG. 1 with a fitting and receiver.

Referring now to FIG. 5, there is depicted an exemplary application of the conduit 10 having a reduced resistance bead 28 formed thereon according to the method described above. In this application, the conduit 10 is connected in sealing engagement by a fitting 60 to a receiver means 62. The fitting 60 is in the form of a body 64 having a plurality of hex-shaped flats 66 formed exteriorly thereon. A bore 68 extends through the body 64 and loosely receives the conduit 10 therethrough, the I.D. of the bore 68 being slightly greater than the O.D. of the conduit 10. An end portion 70 of the body 64 of the fitting 60 extends from the hex flats 66 and has external threads 72 formed thereon. An inner conical surface 74 is formed on the end portion 70 adjacent the exterior end thereof. The conical surface 74 engages the conical surface 18 on the outer flange 16 of the conduit 10, as shown in FIG. 5.

The receiver means 62 may comprise any mounting member to which a fluid conduit 10 is mounted. Thus, the receiver means 62 may comprise a block, valve, etc. A seat 80 is formed within the receiver means 62 and surrounds a through bore 82 which is alignable with the bore 13 in the conduit 10. The seat 80 has an annular, conical end face 84 which matingly engages the reduced resistance bead 28 and/or the inner conical surface 22 of the conduit 10. A plurality of threads 85 are formed internally within an annular end of the receiver means 62 for mating engagement with the threads 72 of the fitting 60 to join the fitting 60 to the receiver means 62 as well as to apply torque to forcibly engage the first end 14 of the conduit 10 with the conical seat 80 in the receiver means 62. Other means for clamping or joining the fitting 60 to the receiver means 62 may also be employed.

In use, the axial extent of the conduit 10 is first slid into the bore 68 in the fitting 60 prior to the fitting 60 being threadingly joined to the receiver means 62. Torque applied to the fitting 60 by means of a tool engaged with the hex flats 66, forcibly urges the conical surface 74 in the fitting 60 into engagement with the exterior conical surface 18 on the first end 14 of the conduit 10 and forces the opposed inner conical surface 22 of the inner flange 20 of the conduit 10 into engagement with the conical end face 84 of the seat 80 in the receiver means 62.

Assuming that all of the components are manufactured within specified manufacturing tolerances, such that the mating conical surfaces 74 and the fittings 60, the exterior conical surface 18 and the inner conical surface 22 of the conduit 10 and the surface 84 of the seat 80 in the receiver means 62 are concentric with each other, a predetermined amount of force applied to the fitting 60 will be sufficient to concentrically dispose the inner surface 22 of the first end 14 of the conduit 10 into metal-to-metal contact with the conical end face 84 of the seat 80 in the receiver 62 to form a leak-free seal therebetween.

However, it is more likely that one of the conical faces is eccentric, or varies angularly, or the conduit 10 is not co-axially aligned with the seat 80 in the receiver 62. The reduced resistance bead 28 of the present invention overcomes any eccentricity or angular variances which may exist between the mating conical surfaces and functions in one of two different ways, depending upon which material forming the conical seat 80 and the receiver 62 or the material forming the conduit 10 is softest. In FIG. 5, it is assumed that the conical seat 80 in the receiver 62 is softer than the material forming the conduit 10. When eccentricity or angular variances exist between the mating conical surfaces, torque applied to the fitting 60 will urge a predetermined angular portion of the reduced resistance bead 28, as indicated generally by reference number 90 in FIG. 5, into and deforming a portion of the conical seat 80 in the receiver 62. This deformation continues until the remaining annular extent 92 of the bead 28 sealingly engages the remainder of the conical end face 84 of the seat 80 to form a leak-free seal therebetween. It should be noted that the arcuate shape of the example of the bead 28 shown in FIG. 5 creates a longer leak path for increased leak resistance as compared to the length of the inner conical surface 22 of the conduit 10.

Figure 6:
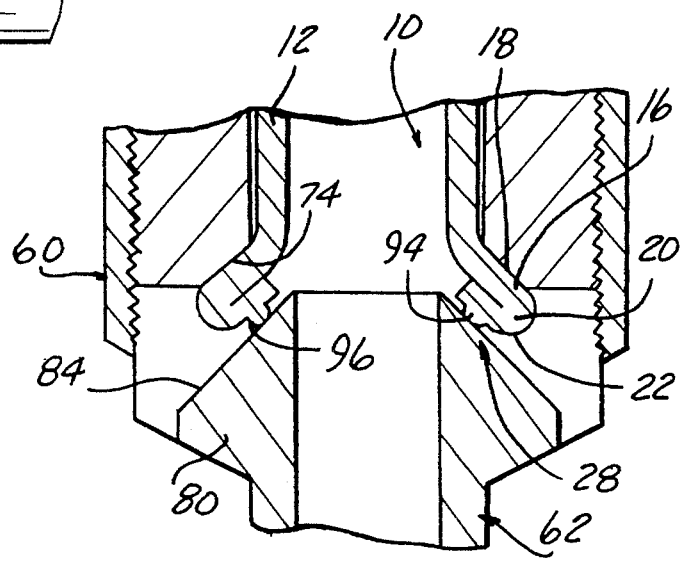
FIG. 6 is a partial, enlarged view, similar to FIG. 5, but showing a different sealing arrangement of the reduced resistance bead on the conical seat of the receiver.

If the conduit 10 is formed of a softer material than the seat 80 of the receiver 62, a different deformation occurs if eccentricity or angular variances exist between the mating surfaces, as shown in FIG. 6. In this example, when the fitting 60 forcibly urges the flared end 14 of the conduit 10 into engagement with the surface 84 of the conical seat 80, a portion of the reduced resistance bead 28, as shown by reference number 94 in FIG. 6, will deform itself. Such deformation will occur over a predetermined angular extent of the bead 28 until the opposed portion of the bead 28, as shown by reference number 96, sealingly engages the surface 84 of the seat 80 to form the desired leak-free seal between the conduit 10 and the seat 80 of the receiver means 62.

It should be noted that in both examples shown in FIGS. 5 and 6, regardless of which element undergoes deformation when the flared end 14 of the conduit 10 is forcibly urged into sealing engagement with the seat 80 in the receiver means 62, the reduced resistance bead 28 has a smaller volume of material as compared to the larger volume of the entire inner flange 20 of the first end 14 of the conduit 10 so as to more easily undergo deformation itself, as shown in FIG. 6, or to more easily cause deformation in the seat 80, as shown in FIG. 5. This substantially reduces the amount of torque needed to be applied to the fitting 60 to forcibly urge the conduit 10 into complete leak-free sealing engagement with the seat 60 in the receiver means 82.

This increased leak resistance with the same or less amount of applied torque was established by tests run on a number of samples of a conventional double or inverted flared end conduit without the reduced resistance bead 28 of the present invention and samples of a conduit 10 having the reduced resistance bead 28 constructed as shown in FIG. 1.

The test samples without the reduced resistance bead required an average of 11.17 newton meters of torque to achieve a leak-free seal between the conduit and the receiver seat. The samples of the conduit 10 utilizing the reduced resistance bead 28 of the present invention required only an average of 6.83 newton meters to achieve the leak-free seal. This represents a reduction of approximately 39% in the amount of torque required to sufficiently tighten the fitting 60 to the receiver 62 to form a leak-free seal between the flared end 14 of the conduit 10 and the seat 80. Even when statistical corrections are made to the test averages to account for the sample size, a conduit 10 having the reduced resistance bead 28 of the present invention thereon still shows a required torque force of approximately 31% less than that required for the conventional conduits lacking the reduced resistance bead 28.

Figure 7:
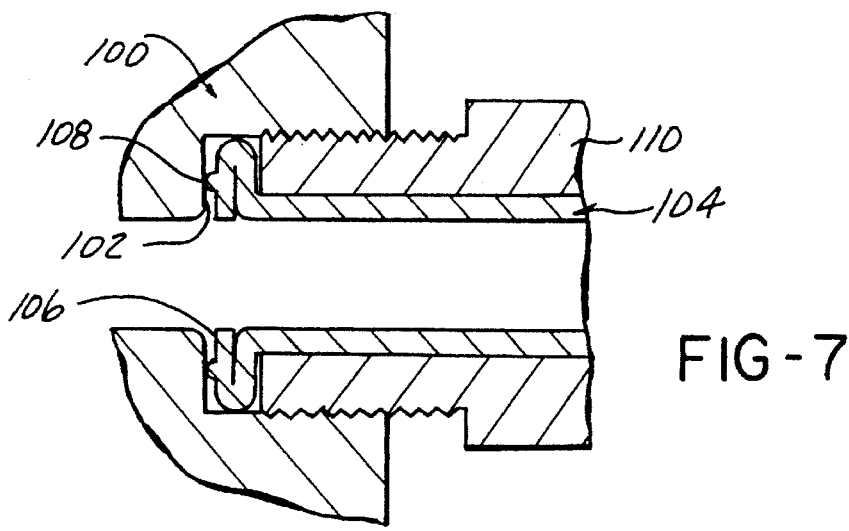
FIG. 7 is an elevational view showing the use of a reduced resistance bead of the present invention with two mating members.

FIG. 7 depicts the use of a reduced resistance bead of the present invention on other shaped elements not having conical mounting surfaces. In FIG. 7, a first member 100 is provided with a first mounting face or surface 102. A second member 104 is provided with a corresponding mounting face or surface 106. As shown in FIG. 7, the mounting surfaces 102 and 106 are arranged at a 90° angle with respect to the remaining portions of each member 100 and 104.

A reduced resistance bead 108 is formed on one of the members, such as member 104, and extends integrally outward from the mounting surface 106 of the member 104. Suitable joining means, such as a fitting 110 which threadably engages a threaded bore in the first member 100, are employed to forcibly connect the first and second members 100 and 104 in mating engagement. The reduced resistance bead 108 functions in the same manner as the bead 28 described above and undergoes deformation or causes deformation in the mounting face 102 of the member 100 to account for any eccentricity or angular variances between the two members 100 and 104 and to provide a leak-free seal between the metal-to-metal engaged surfaces 102 and 106 of the members 100 and 104.

Figure 10:
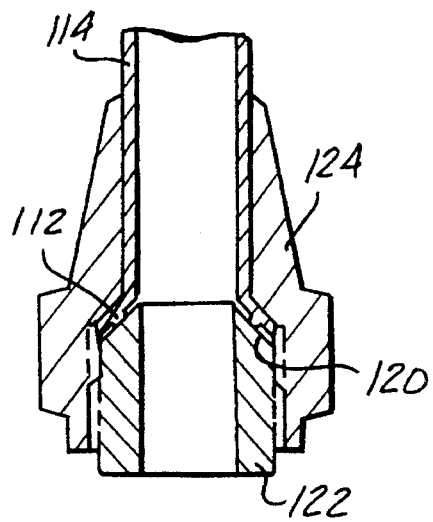
FIG. 10 is a cross sectional view showing the conduit depicted in FIG. 9 mounted in a two piece tube assembly.
Figure 9:
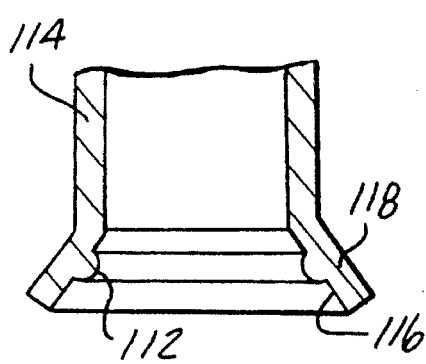
FIG. 9 is a partial, enlarged view showing a reduced resistance bead of the present invention on a single flared end conduit.

FIGS. 9 and 10 depict the use of a reduced resistance seal or bead 112, identical to the bead 28 described above, on a single flared end conduit 114. In this application, the bead 112 is integrally formed on the inner conical surface 116 of the single flared end flange 118 of the conduit 114. The bead 112 sealingly engages a conical mounting surface 120 formed in a receiver 122 which is one part of a conventional two piece tube assembly also including a fitting 124. The fitting 124 and receiver 122 function in the same manner as the fitting 60 and receiver 62 shown in FIG. 5 to sealingly mount the single flared end flange 118 of the conduit 114 to the receiver 122.

Other fitting/receiver assemblies, such as a three piece assembly employing an additional sleeve or collar, may also be employed with either of the conduits 10 and 112 having the reduced resistance seals or beads of the present invention formed thereon.

In summary, there has been disclosed a unique mounting arrangement and method for forming a leak-free seal between the mating mounting faces of two members arranged in metal-to-metal contact. A reduced resistance seal or bead is integrally formed on the mounting surface of one member and undergoes deformation or causes deformation in the opposite mounting surface to account for any eccentricity, angular variance, or misalignment of the two members when the two members are urged into forced engagement. The reduced resistance bead of the present invention is easily formed on any component utilizing existing assembly methods such that it is usable as a drop-in replacement for existing components, such as fluid components, without requiring any modifications to the corresponding fittings, receivers or other mounting or connector elements. The unique reduced resistance bead also requires the same or less torque to join the fittings together to form the desired leak-free seal.

What is claimed is:

1. A sealed mounting apparatus comprising:

a first member having a first end extending radially outward at a predetermined angle from an axial extent of the first member; the first end of the first member including an outer conical flange and an inner conical flange formed as a continuous extension of the outer flange and disposed radially inwardly of and in registry with the outer flange;

the inner conical flange having a continuously linear shape;

a second member having a mounting surface complementary to the inner conical flange of the first member;

an annular reduced resistance bead integrally formed as a continuous one-piece, radially inwardly projecting extension of the inner conical flange of the first member, the annular bead having a hardness greater than a hardness of the mounting surface of the second member to form a deformable seal between the first and second members by deformation of the mounting surface of the second member by the annular bead, a deformable portion of the mounting surface of the second member extending over an annular extent less than 360° of the annular bead and the mounting surface of the second member necessary to bring the entire 360° annular extent of the bead into sealing engagement with the mounting surface of the second member when the first and second members are joined together.

2. The sealed mounting apparatus of claim 1 wherein the reduced resistance bead has an arcuate shaped exterior surface.

3. The sealed mounting apparatus of claim 1 wherein the reduced resistance bead has a polygonal shaped exterior surface.

4. The sealed mounting apparatus of claim 1 wherein:

the first end of the first member extends at a 45° angle from the axial extent of the first member.

5. The sealed mounting apparatus of claim 1 wherein:

the annular bead has a width smaller than a length of the inner conical flange of the first member.

6. A fluid conduit connector apparatus comprising:

a conduit having a first diameter and a first end;

the first end flared radially outward to a second end diameter from the axial extent of the conduit and having an end flange with a first conical exterior surface and a second, continuously linear, conical inner surface formed thereon;

a reduced resistance annular bead integrally formed as a continuous, one-piece, radially inward extension of the second inner surface;

a fitting have a through bore receiving the conduit therethrough, a fitting conical surface formed on one end of the fitting and engageable with the first conical exterior surface on the first end of the conduit;

receiver means having a conical seat formed complementary to the second conical surface of the conduit;

the conduit and the annular bead being formed of a harder material than a material forming the conical seat of the receiver means; and means for fixedly attaching the fitting to the receiver means to force the fitting conical surface into engagement with the first exterior conical surface on the first end of the conduit and to deformably engage the annular bead with the conical seat in the receiver means by deformation of the conical seat of the receiver means by the annular bead, a deformable portion of the conical seat of the receiver means extending over an annular extent less than 360° of the bead and the conical seat of the receiver means necessary to bring the entire 360° annular extent of the bead into sealing engagement with the conical seat of the receiver means.

7. The connector apparatus of claim 6 wherein:

the first end of the conduit extends at a 45° angle from the axial extent of the conduit.

8. The connector apparatus of claim 6 wherein:

the reduced resistance bead has an arcuate shaped exterior surface.

9. The connector apparatus of claim 6 wherein:

the annular bead has a polygonal shaped exterior surface.

10. The connector apparatus of claim 6 wherein:

the annular bead has a width smaller than a length of the second inner surface of the conduit.

11. The connector apparatus of claim 6 wherein the attaching means comprises:

mating threads formed on the fitting and the receiver means for threadingly engaging the fitting and the receiver means.

12. The connector apparatus of claim 6 further comprising:

a portion of the end flange of the conduit being bent inwardly onto itself and forming an inner flange having the second conical surface formed thereon and disposed substantially parallel to the first conical surface.

\* \* \* \* \*